H. H. Cottrill,
Animal Trap.
No. 87,548. Patented Mar. 9, 1869.
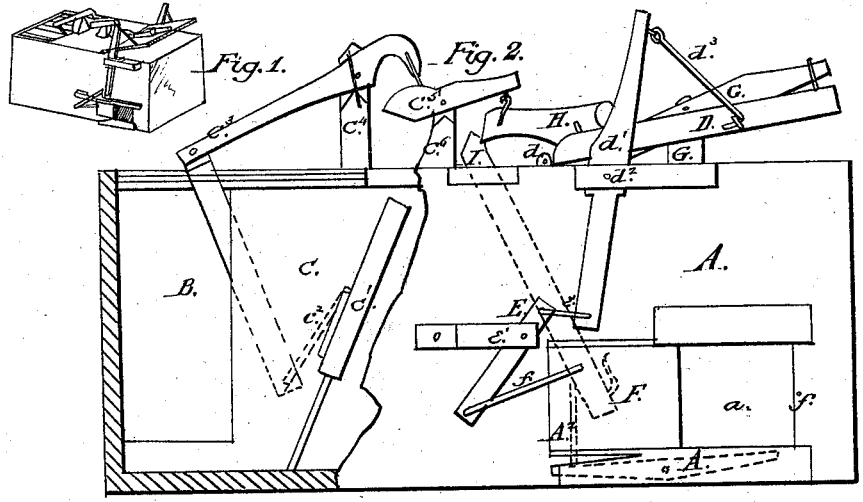
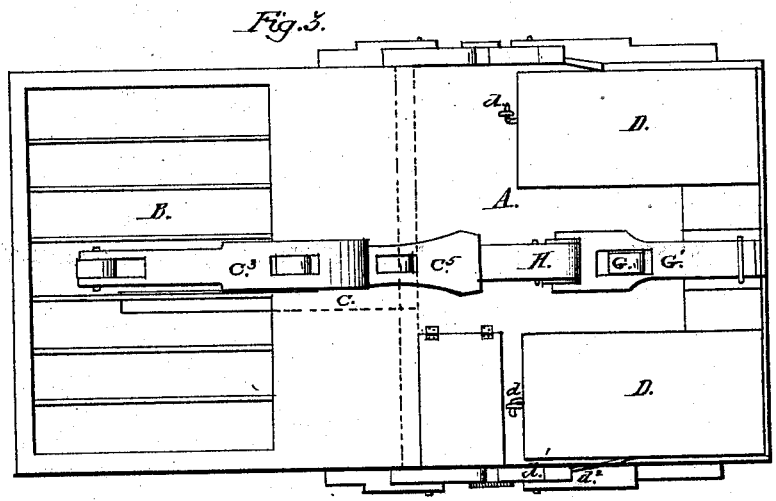
Witnesses:
Inventor:
H. H. Cottrill
per H. W. Beadle
attorney

HENRY H. COTTRILL, OF VINTON STATION, OHIO.

*Letters Patent No. 87,548, dated March 9, 1869.*

IMPROVED ANIMAL-TRAP.

The Schedule referred to in these Letters Patent and making part of the same.

*To all whom it may concern:*

Be it known that I, HENRY H. COTTRILL, of Vinton Station, in the county of Vinton, and State of Ohio, have invented new and useful Improvements in Animal-Traps; and I do hereby declare that the following is a full and exact description of the same, reference being had to the accompanying drawings, and to the letters of reference marked thereon.

This invention consists in the peculiar construction and arrangement of the various parts of an animal-trap, as will be fully described hereinafter.

Figure 1 is a perspective view,
Figure 2, a side elevation, and
Figure 3, a plan view of my improved trap.

In order that those skilled in the art may make and use my improved trap, I will proceed to describe its construction and operation.

The same letters refer to identical parts in all the figures of the drawings.

This trap belongs to that class of traps in which the animal, when caught, is attracted into another apartment, for the purpose of resetting the trap for a new comer.

It is divided into two main apartments, A and B, the latter of which is again partially subdivided by the partition C.

The apartment A is closed in upon all sides, and has only the openings $a\ a$, through which the animal is enticed into the trap, and $a'$, which leads into the apartment B.

The apartment B is provided with bars, for the purpose of admitting light, a portion of which is removable, in order that the caught animal may be taken out.

Within the passage formed between the partition C and the side of the trap, swings a door or gate, $C^1$, which moves freely in one direction, to permit an animal in apartment A to enter, but which cannot open in an opposite direction, so that, when the gate is once passed, return is impossible.

D represents a platform, or weighted frame, which is hinged, at $d\ d$, upon the top of the trap.

$d^1\ d^1$ represent levers, pivoted in the bearings $d^2$, one end of which is connected to the frame D, by means of the rods $d^3$, and the other end attached to the levers E, by the links $e$.

The levers E swing on pivots in the bearings $e'$, and are attached to the sliding doors F by the rods $f$.

The doors F, when closed, cover the openings into this trap. They slide in ways, as shown, and their motion, in one direction, is limited by the stop $f'$, and in the other, by the lever E.

G represents a standard, rising from the top of the trap, between the sides of the frame D, upon which is pivoted a lever, G', which latter is attached, at one end, to the frame D, as shown, and at the other end has resting upon it the short arm of lever H.

The long arm of this lever rests, when the trap is set, in a notch in the top of the bait-trigger I, as clearly shown in fig. 2.

This trigger is so arranged that it will continually fall into position below lever H, if the latter be elevated.

A represents a tilting platform, which has a limited movement, sufficient to throw forward the lower end of bait-trigger I, (by means of the upright, $A^2$,) when its forward end is depressed.

By this movement, the upper end of the trigger is thrown out from beneath the long arm of lever H, and the latter is allowed to descend.

The arrangement of levers, already described, with their connections, forms the catching-part of the trap, which operates as follows:

The trap having been baited and set, the long arm of lever H rests in the notch in the top of the bait-trigger I, as has been described. The free end of frame D is thus necessarily elevated, through the medium of levers G' and H, by which movement the doors of the trap are opened.

If an animal, enticed by the bait, steps upon the platform A, or pulls at the bait on the hook of the trigger I, (for, in either case, the result is the same,) the latter is disengaged from contact with the lever H, by which operation the frame D is left without support, and falls by its own weight. At the same time, it closes the doors, through the medium of the connecting-levers described.

The closing of the doors occurs almost instantaneously upon the movement of the trigger, so that escape is rendered impossible.

The devices for resetting the trap are as follows:

Attached to the journals upon which swings the gate $C^1$, which closes the opening between apartments A and B, is the crank $C^2$, connecting with the elbow-lever $C^3$.

This lever is pivoted upon the standard $C^4$; and its short arm rests upon the lever $C^5$, pivoted upon the standard $C^6$.

The lever $C^5$ is connected, by hooks, with the lever H.

It will be observed that the lever $C^3$ is so arranged as to permit the lever $C^5$ to have the necessary play, when the trap is sprung, without interfering with its movement.

This lever is also provided, upon its edge, with a small rod, attached thereto, by means of which wear is prevented, and the friction is reduced.

The operation of resetting the trap is as follows:

The animal, when caught, naturally pushes through the passage-way, in the direction from which the light comes. In so doing, he passes the gate $C^1$, and finds return impossible.

In raising the gate, the lever H is elevated, by means of the levers $C^3\ C^5$, and the bait-trigger I falls naturally into its proper position beneath it.

I am well aware that the trap is somewhat similar, in its general arrangement, to traps already patented. It has, however, features which are novel, and of practical utility.

The arrangement of frame D is a desirable one.

It sometimes happens, in traps of this description, that some of the parts do not move freely. To overcome this difficulty in my trap, it is only necessary to lay sufficient weight upon the platform to overcome the resistance.

Having thus fully described my invention,

What I claim as new, and desire to secure by Letters Patent of the United States, is—

In an animal-trap of the described construction, the frame D, with its connecting-levers $d^1$ E, and doors F, when constructed as described, and combined with the resetting-devices $C^1$ $C^3$ $C^5$ and bait-trigger I, as and for the purpose set forth.

This specification signed and witnessed, this 16th day of September, 1868.

HENRY H. COTTRILL.

Witnesses:
 ARNOLD GREGORY,
 HENDERSON PERRY.